US006899128B2

(12) United States Patent
Oh

(10) Patent No.: US 6,899,128 B2
(45) Date of Patent: May 31, 2005

(54) HALF BALL VALVE

(76) Inventor: Seung-Jun Oh, 99-1 Hyangsan-ri, Gochon-myun, Kimpo-si, Kyungki-do (KR)

( * ) Notice: Subject to any disclaimer, the term of this patent is extended or adjusted under 35 U.S.C. 154(b) by 337 days.

(21) Appl. No.: 10/290,604

(22) Filed: Nov. 8, 2002

(65) Prior Publication Data
US 2003/0217771 A1 Nov. 27, 2003

(30) Foreign Application Priority Data

May 27, 2002 (KR) .............................. 10-2002-0029297
Oct. 11, 2002 (KR) .............................. 10-2002-0062108

(51) Int. Cl.$^7$ ............................................... F16K 5/06
(52) U.S. Cl. ............. 137/556; 251/315.01; 251/315.16; 251/314; 137/385
(58) Field of Search .................................. 137/385, 553, 137/556; 251/315.01, 315.1, 315.16, 314, 304

(56) References Cited

U.S. PATENT DOCUMENTS

| | | | | |
|---|---|---|---|---|
| 3,697,043 A | * | 10/1972 | Baker ........................ | 251/315.1 |
| 3,893,469 A | * | 7/1975 | Baker ........................ | 251/315.15 |
| 4,150,811 A | * | 4/1979 | Condit ....................... | 251/315.08 |
| 5,727,595 A | | 3/1998 | Eminger ..................... | 137/876 |
| 5,785,074 A | * | 7/1998 | Kieper ....................... | 137/68.11 |
| 5,799,928 A | * | 9/1998 | Siver ......................... | 251/315.16 |
| 6,199,824 B1 | * | 3/2001 | Lee ........................... | 251/315.1 |
| 6,467,500 B2 | * | 10/2002 | Fridlyand ................... | 137/385 |

FOREIGN PATENT DOCUMENTS

| | | |
|---|---|---|
| DE | 1675545 | 1/1973 |
| DE | G9408156.5 | 9/1994 |
| DE | 44 44 031 C1 | 6/1996 |
| DE | 199 40 471 A1 | 3/2001 |
| GB | 970507 | 9/1964 |
| GB | 1175306 | 12/1969 |
| GB | 2206183 | 12/1988 |
| KR | U1997-010226 | 3/1997 |

* cited by examiner

*Primary Examiner*—Kevin Lee
(74) *Attorney, Agent, or Firm*—St. Onge Steward Johnston & Reens LLC

(57) ABSTRACT

A half ball valve includes a body including cavity having an assembly opening, a stem opening formed at a side of the body opposite to the assembly opening to connect the cavity and the outside, and a first connection hole inclined with respect to an axis of the stem opening. A ball is accommodated in the cavity of the body through the assembly opening to be capable of rotating to switch between an open position at which the first connection hole is open and a close position at which the first connection hole is blocked. A passage is formed in the ball inclined with respect to an axis of the stem opening and is connected to the first connection hole at the open position. A stem connects a control lever outside the body and the ball along the stem opening. A body cap having a second connection hole connected to the passage of the ball is coupled to the body to cover the cavity at the assembly opening side. A packing is interposed between an outer surface of the ball and an inner wall of the body. Thus, the size of the ball can be reduced and, when the passage in the pipeline is blocked, the fluid flowing in the pipeline is not confined in the passage of the ball. Also, not only is dead space not formed but also the gap between the ball and the body is completely sealed by the space filler, so that the fluid flowing through the pipeline is prevented from remaining in the gap and being deposited therein. Furthermore, the full bore concept can be realized in which no difference exists between the amount of the fluid that is coming in through the inlet and the amount of the fluid that is discharged through the outlet in the ball valve installed on the pipeline.

20 Claims, 9 Drawing Sheets

HALF BALL VALVE

BACKGROUND OF THE INVENTION

This application claims the priorities of Korean Patent Application No. 2002-29297, filed on May 27, 2002, and Korean Patent Application No. 2002-62108 filed, on Oct. 11, 2002, in the Korean Intellectual Property Office, the disclosures of which are incorporated herein in their entirety by reference.

1. Field of the Invention

The present invention relates to a half ball valve, and more particularly, to a half ball valve installed on a pipeline to open and close fluid flowing in the pipe.

2. Description of the Related Art

Typically, a ball valve installed on a pipeline controls the flow of fluid in the pipeline. The ball valve opens and closes a passage of fluid flowing in the pipeline by a ball rotating in a valve seat provided inside a body.

The ball valve is classified into a manual type and an electromotive type according to the type of operation. The ball valve controlling fluid flowing in the pipeline by a ball is widely used in a fan coil or heat exchanger of various air conditioners, an automatic open/close valve or protecting a control valve, protecting various fluid mechanisms or mechanical apparatuses, water supply and hot water supply, and vending machines.

A valve for a liquid pipe and a liquid tank having various sizes and structures is well known in relation to the ball valve. In most cases, for example, a gap between a ball and the inner wall of a body or a dead space where liquid remains should not be formed around the ball. If the gap is formed, fluid can enter into the gap during the opening/closing process of the valve and another fluid passing the ball valve can be contaminated by the fluid remaining in the gap or the dead space. However, it is difficult to prevent formation of the gap between the ball and the inner wall of the body or the dead space because the ball valve requires a superior assembly feature and a superior water seal maintenance feature when the fluid flow is blocked and a relatively less operation torque during the opening/closing of a passage.

Korean Utility Model Registration No. 0269119 discloses a ball which opens and closes a passage by being rotated in a pair of valve seats installed at an inlet connection hole and an outlet connection hole formed in a body by the operation of a control lever. In this case, a superior water seal maintenance feature is exhibited between the valve seat and ball. However, since a gap between the ball and the inner wall of the body or the dead space is formed, when the valve is closed, fluid is confined in a passage in the ball so that the fluid intrudes into the gap between the ball and the inner wall of the body and is deposited in the gap or the dead space.

German Patent No. 9408156 U1 discloses a half type ball valve having a packing completely covering an inner wall of a body defining a hemispherical cavity accommodating a ball having a passage formed therein coaxially with a connection hole formed in the body. The packing manufactured of polytetrafluoroethylene (PTFE) prevents deposition of fluid intruding between the ball and the inner wall of the body. However, when the packing is damaged, the entire packing set should be replaced with a new one. Furthermore, when the passage is blocked, the fluid passing through the passage in the ball is confined in the passage in the ball.

Also, Korean Utility Model Registration No. 0138535 discloses a half ball valve. The half ball valve includes a body in which a cavity, an inlet connection hole, and an outlet connection hole are formed, a hemispherical ball accommodated in the cavity of the body to be capable of rotating between open and close positions at which the inlet connection hole and the outlet connection hole are connected and disconnected, respectively, and having a passage formed therein to connect the inlet connection hole and the outlet connection hole at the open position, and a cover arranged at the lower portion of the housing to close the cavity. When the ball is positioned at the close position, a pair of seal members, each having a dome shaped lower portion to cover the inlet connection hole and the outlet connection hole, are coupled to a partial area of the outer surface of the ball, that is, the outer surface area of the ball approximately perpendicular to the axis of the passage in the ball. In the half ball valve, however, a gap is formed between the outer surface of the ball which is not coupled to the seal member and the body so that fluid intrudes into the gap when the ball is rotated to open or close the passage. Furthermore, when the passage is blocked, fluid passing through the passage in the ball is confined in the passage. The fluid confined in the passage in the ball intrudes into the gap between the outer surface of the ball and the body and is deposited therein. Also, since the seal member needs to be provided at the outer surface of the ball, the size of the ball increases.

In the above-described ball valve or half ball valve, the size of the ball is large and there is a problem that fluid flowing in the pipeline is confined in the passage of the ball when the passage of the pipeline is blocked. In the process of rotating the ball to open/close the passage, the fluid passing through the passage in the ball intrudes into the gap between the body and the inner wall of the ball or the dead space and remains and is deposited therein. Thus, when the ball is rotated through the control lever connected by a stem the opening/closing of the ball is not smooth so that a problem occurs in the operation of the ball valve. Also, since the fluid initially flowing through the pipeline remains in the gap or dead space between the body and the ball, when fluid having different physical property or color is transferred through the pipeline, the fluid having different physical property or color is mixed with the initial fluid remaining in the gap between the inner wall of the body and the ball or the dead space so that the physical property or color of the fluid transferred later is changed. Thus, in a pipeline on which the conventional ball valve is installed, when fluid having different physical property or color is to be transferred through the pipeline through which initial fluid has been transferred and the initial fluid remains in the gap between the inner wall of the body and the ball or the dead space, the ball valve installed on the pipeline needs to be inconveniently disassembled and the fluid remaining in the gap between the inner wall of the body and the ball or the dead space should be clearly removed and the ball valve is reassembled and the fluid having different physical property or color is transferred through the pipeline.

SUMMARY OF THE INVENTION

To solve the above and other problems, the present invention provides a half ball valve which is installed on a pipeline and can reduce the size of a ball, prevent fluid flowing in a pipeline from being confined in a passage formed in the ball when the passage in the pipeline is blocked, not only prevent forming of a dead space but also completely seal a gap between the ball and the inner wall of a body by a space filler to prevent the fluid transferred through the pipeline from remaining in the gap and being deposited therein, thus realizing a full bore type concept in which there is no difference between the amount of fluid coming in through an inlet of the ball valve and the amount of fluid discharged through an outlet.

According to one aspect of the present invention, a half ball valve comprises a body including cavity having an assembly opening, a stem opening formed at a side of the body opposite to the assembly opening to connect the cavity and the outside, and a first connection hole inclined with respect to an axis of the stem opening, a ball accommodated in the cavity of the body through the assembly opening to be capable of rotating to switch between an open position at which the first connection hole is open and a close position at which the first connection hole is blocked, and having a passage connected to the first connection hole at the open position and formed inclined to an axis of the stem opening, a stem connecting a control lever outside the body and the ball along the stem opening, a body cap having a second connection hole connected to the passage of the ball and coupled to the body to cover the cavity at the assembly opening side, and a packing interposed between an outer surface of the ball and an inner wall of the body.

The ball of the half ball valve according to the present invention may be a nearly hemispherical ball or a conic or cylindrical ball. Here, the hemispherical ball described herein does not mean a geometrically accurate ball and covers a ball which does not form a perfect sphere or a ball slightly greater than a hemispherical ball.

The outer surface of the ball and the inner wall of the body are formed to approximately corresponding to each other. It is preferable that the gap between the ball and the body or the dead space is not formed.

The packing is integrally formed into one piece and is a space filler having an opening in a position at which the first connection hole is formed and closely contacting both the outer surface of the ball and the inner wall of the body. Thus, the gap between the ball and the body can be completely sealed so that no cavity exists in the half ball valve and fluid does not intrude into the gap inside the pipeline and is not deposited therein. The space filler assures a uniform rotational torque in the whole open/close portion without increasing an opening force or closing force. The space filler is formed of polytetrafluoroethylene (PTFE) and the space filler is formed in a foil casting method.

The passage in the ball is inclined at an angle of between 30°–60° with respect to the stem. Preferably, the passage is inclined at an angle of about 45°.

The first connection hole of the body and the second connection hole of the body cap are coaxially formed. The second connection hole of the body cap has a central axis having an angle of about 90° with respect to a central axis of the first connection hole. The second connection hole of the body cap is coaxially formed with the stem.

The inclination of the second connection hole disposed in the body cap is determined according to the use of the half ball valve according to the present invention. Accordingly, when fluid proceeds linearly, the first connection hole and the second connection hole are coaxially formed. Here, when the body cap is rotated 180°, the axis of the second connection hole is perpendicular to the axis of the first connection hole so that an angle type half ball valve can be obtained. When the half ball valve according to the present invention is used as a ball valve for discharge in a tank or for a similar purpose, the second connection hole can be formed coaxially with respect to the stem.

The body further comprises a third connection hole formed at least one of positions spaced horizontally at angles of 90°, 180°, and 270° from the first connection hole around the center axis of the stem. As a result, a multi-way distributor can be obtained. Most preferably, the third connection hole is provided at the position rotated by 180°. When the valve is not used a multi-way distributor, the third connection hole is sealed by a seal cover accommodated in the third connection hole and further comprises a ring packing provided between the seal cover and the ball and having a diameter greater than that of the passage.

The body has an outside contour of a hemispherical shape and comprises a sleeve where the stem opening of the body is formed. A circular groove is formed in the body cap and a circular shoulder accommodated in the groove of the body cap is provided at the end portion of the ball at the body cap side. Thus, the center position of the ball is determined.

An O-ring packing is inserted between the groove of the body cap and the shoulder of the ball.

The control lever comprises an extension rod coupled to the stem, and a holder member coupled to the extension rod to be capable of sliding in a direction crosswise to a direction of the axis of the extension rod.

The half ball valve further comprises a position indication portion indicating the position of the ball with respect to the first connection hole.

The position indication portion comprises a rotation plate fixed to the stem and rotating by being engaged with the rotation of the stem and having a plurality of position determination grooves formed by indenting part of an edge portion to a predetermined depth toward the center of rotation, an indication member fixed to the body to indicate a specific point of an upper portion of the rotation plate, and a sound generating member coupled to the body to be capable of elastically moving toward the center of the rotation plate and elastically contacting the edge portion of the rotation plate and generating sound by colliding with the edge portion when being accommodated in the position determination groove.

The half ball valve further comprises a locking member coupled to the body at a side portion of the rotation plate to be capable of sliding between a locking position at which the locking member is locked in the position determination groove of the rotation plate and maintained in the position determination groove and a release position at which the locking member is released from the position determination groove. Even when a force is applied to the control lever, since the ball is not rotated, the ball can be maintained at the constant position, if needed.

The half ball valve according to the present invention can be used to obtain samples in the fields such as measurement engineering or control engineering. In the half ball valve according to the present invention, an assembly part of a unit or a connection pipeline for cleaning which is used to empty the remaining fluid from the pipeline can be connected.

The half ball valve according to the present invention can be used with a variety of sizes in the various fields, for example, chemistry, biochemistry, pharmaceutics, food industries, cosmetics industries, plating industries, ink and paint industries, analysis engineering, medicine, high purity gas technologies, sterilization technologies, and cryogenics.

In the half ball valve according to the present invention, since a connection passage always exists between an inlet pipe and an outlet pipe for fluid in a close state, an additional decompressing apparatus is not needed.

BRIEF DESCRIPTION OF THE DRAWINGS

The above advantages of the present invention will become more apparent by describing in detail preferred embodiments thereof with reference to the attached drawings in which.

DETAILED DESCRIPTION OF THE INVENTION

Figure 1:
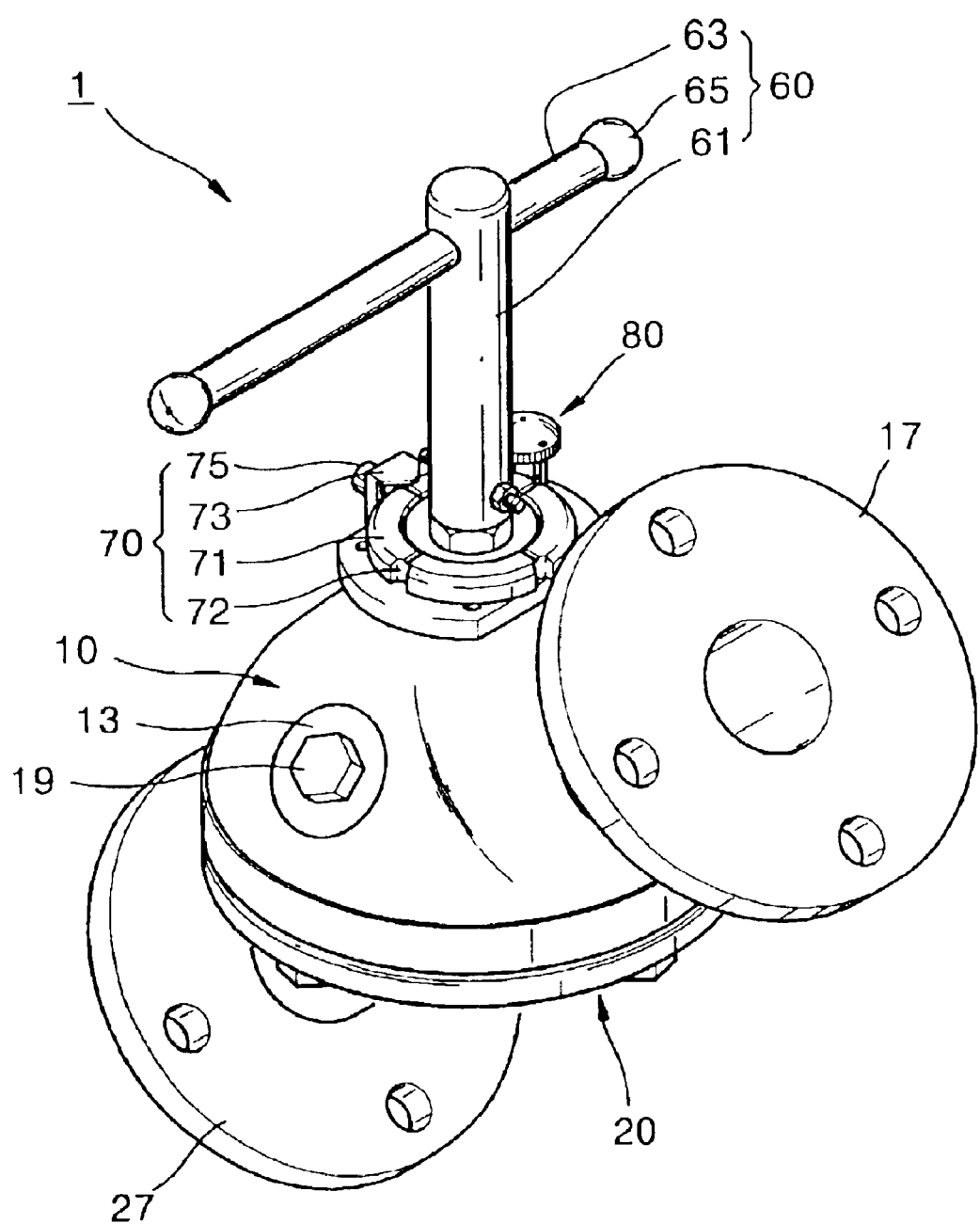
FIG. 1 is a perspective view of a half ball valve according to a first preferred embodiment of the present invention.
Figure 2:
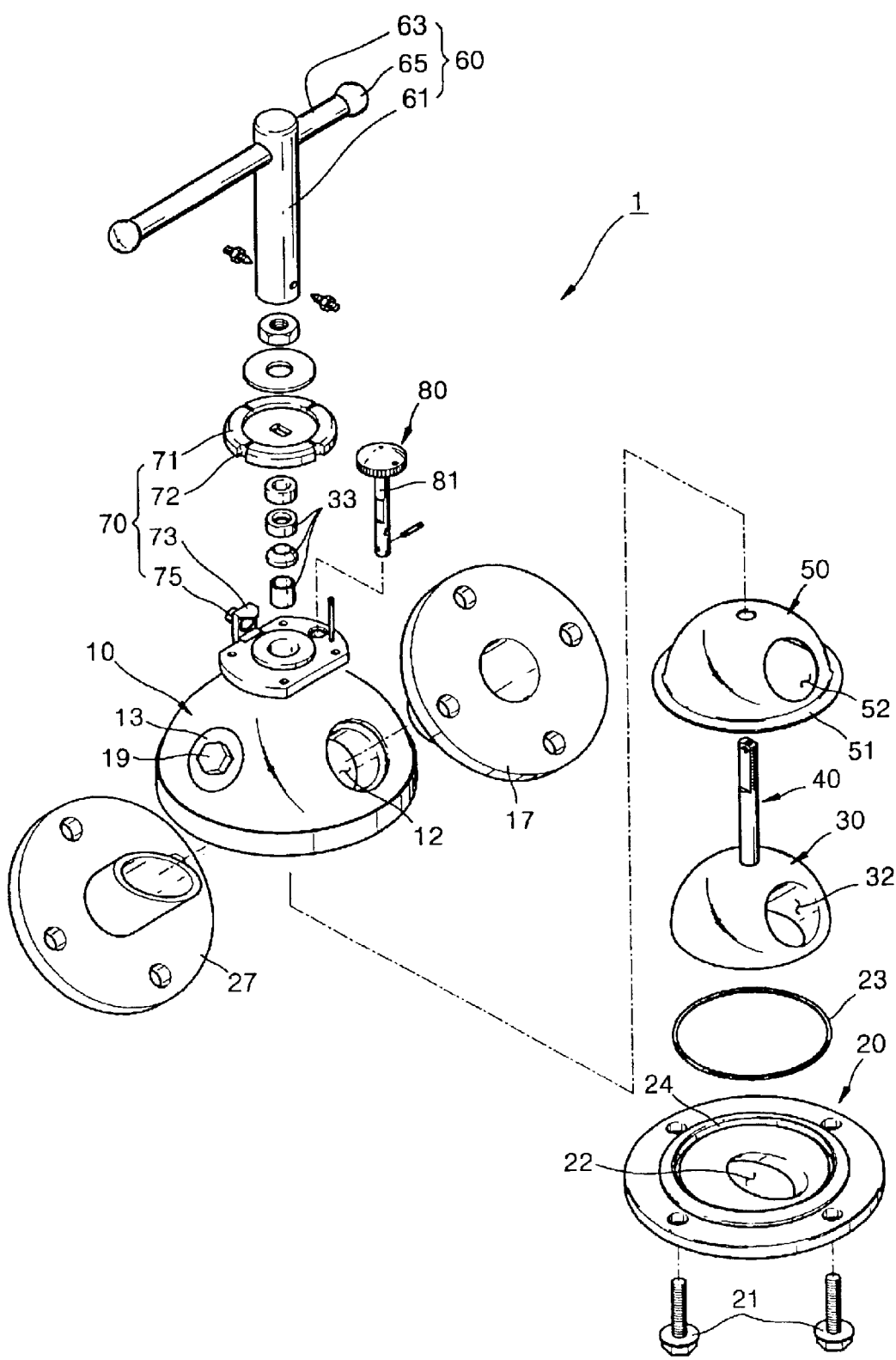
FIG. 2 is an exploded perspective view of the half ball valve of FIG. 1.
Figure 3:
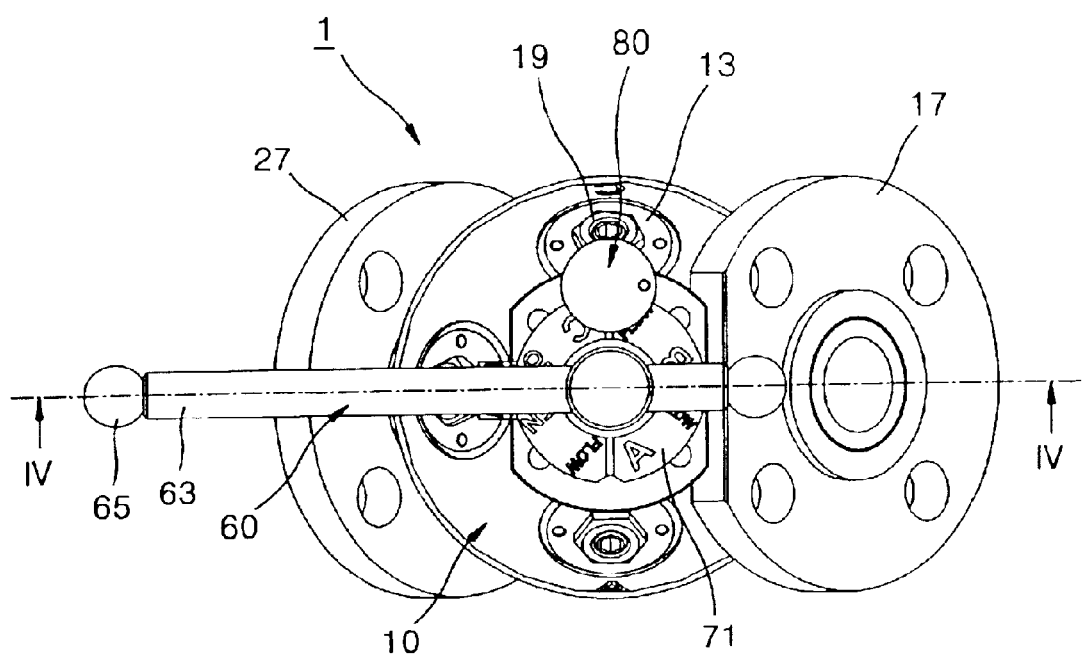
FIG. 3 is a plan view of the half ball valve of FIG. 1.
Figure 4:
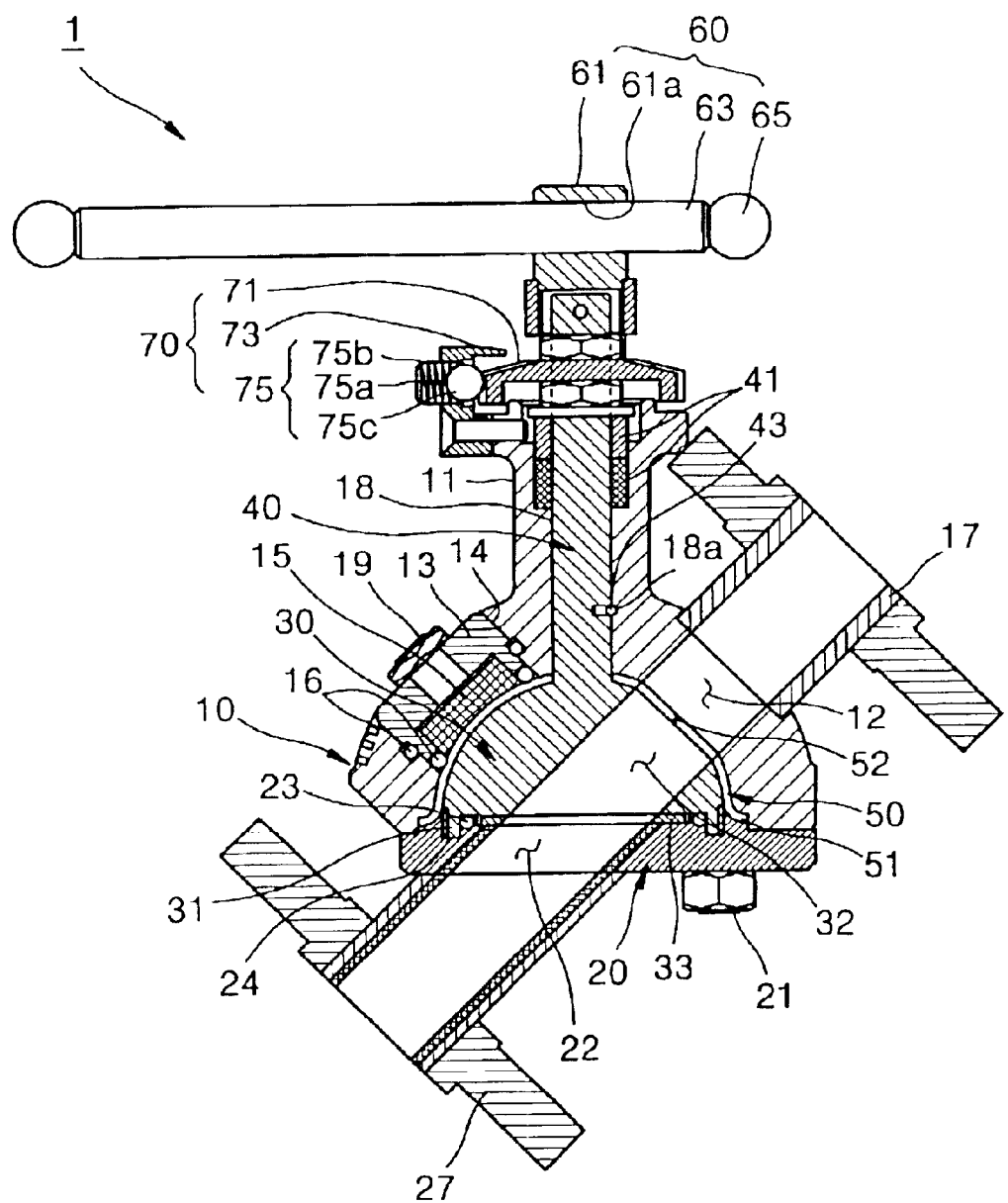
FIG. 4 is a sectional view taken along line IV—IV of FIG. 3.

Referring to FIGS. 1 through 4, a half ball valve 1 according to a first preferred embodiment of the present invention includes a body 10 having an outside contour of a hemispherical shape in which a first connection hole 12 and a cavity are formed, a ball 30 accommodated in the cavity of the body 10 to be capable of rotating to switch between an open position at which the first connection hole 12 is open and a close position at which the first connection hole 12 is closed, and having a passage 32 connected to the first connection hole 12 at the open position, a stem 40 protruding from the outer surface of the ball 30 along a stem opening 18, a body cap 20 having a second connection hole 22 connected to the passage 32 of the ball 30 and coupled to the body 10 to cover the cavity at an assembly opening (not shown) side a space filler 50 that is an integral packing tightly interposed between the outer surface of the ball 30 and the inner wall of the body 10 and closely contacting them, a control lever 60 coupled to the stem 40 outside the body 10 to operate the ball 30, a position indication portion 70 to indicate the position of the ball 30 in the cavity by indicating the position of the ball 30 with respect to the first connection hole 12, and a locking member 80 coupled to the body 10 to prevent the ball 30 from rotating even through a force is applied to the control lever 60.

The body 10 includes the cavity having the assembly opening for assembly of the ball 30, the stem opening 18 formed at the opposite side of the assembly opening to connect the cavity and the outside, the first connection hole 12 inclined with respect to an axis of the stem opening 18, third connection holes 14 formed at positions spaced horizontally at angles of 90°, 180°, and 270° from the first connection hole 12 around the center axis of the stem 40, and a sleeve 11 in which the stem opening 18 is formed. In the present preferred embodiment, the first connection hole 12 and the third connection holes 14 are formed to penetrate the body 10 at an angle of about 45° with respect to the axis of the stem opening 18. A flange pipe 17 is inserted into the first connection hole 12 and welded thereto. A seal cover 13 sealing the respective third connection holes 14 is accommodated in each of the third connection holes 14. A groove (not shown) is formed in the seal cover 13 and a ring packing 15 contacting the outer surface of the space filler 50 is accommodated in the groove. An O-ring packing 16 is inserted and installed at the bottom of the seal cover 13 at the outer portion of the groove. The seal cover 13 is fixed by a screw 19 at a step type opening (not shown). The ring packing 15 has a diameter greater than that of the passage 32. Of course, the seal cover 13 is removed when the third connection hole 14 needs to be open as in the case where the half ball valve is used as a multi-way valve or multi-way distributor.

The ball 30 having a hemispherical shape corresponding to the shape of the inner wall of the body 10 closely contacts the inner wall of the body 10 as it is accommodated in the cavity of the body 10, is connected to the stem 40, and is rotated in the cavity of the body 10 by the control lever 60 disposed outside the body 10. Also, the ball 30 is accommodated in the cavity of the body through the assembly opening to be capable of rotating to switch between an open position at which the body 10 and the first connection hole 12 are connected and a close position at which the body 10 and the first connection hole 12 are disconnected. The passage 32 connected to the first connection hole 12 at the open position is formed to be inclined with respect to the stem opening 18 or the stem 40 by penetrating the bail 30. The diameter of the passage 32 in the ball 30 is similar to or the same as that of the first connection hole 12 formed in the body 10. The diameter of the passage 32 in the ball 30 are the same as or almost similar to that of the first connection hole 12 formed in the body 10. The passage 32 in the ball 30 is inclined by about 45° with respect to the stem 40. Thus, when the half ball valve 1 is open, that is, the first connection hole 12 is open by the ball 30, the passage 32 of the ball 30 is coaxially connected to the first connection hole 12. In the meantime, a circular shoulder 31 accommodated in a groove 24 of a body cap 20 which will be described later is formed at the bottom surface of the ball 30. A ball packing 33 is attached to the inner side of the shoulder 31 to be arranged between the ball 30 and the body cap 20.

The stem 40 extends from the outer surface of the ball 30 along the stem opening 18 so that a free end of the stem 40 is disposed outside the body 10 by penetrating the stem opening 18. The control lever 60 is coupled to the free end of the stem 40. A stem packing 41 is provided between the inner side of the sleeve 11 and the stem 40. A hook groove 18a is formed in the inner circumference of the stem opening 18 under the stem packing 41 while a hook member 43 elastically deformed perpendicular to the axis of the stem 40 is installed corresponding to the hook groove 18a. Accordingly, when the stem 40 is accommodated in the stem opening 18, the hook member 43 is inserted into the hook groove 18a. However, the above hooking is released when a force exceeding an elastic force of the hook member 43 is applied to the stem 40.

Also, the body cap 20 is assembled to the body 10 to cover the cavity at the assembly opening side. The second connection hole 22 connected to the passage 32 of the ball 30 is formed in the central area. A circular groove 24 corresponding to the shoulder 31 is formed to accommodate the shoulder 31 of the ball 30 along the circumference thereof. The body cap 20 is coupled to the body 10 by a bolt 21. In the present preferred embodiment, the axis of the second connection hole 22 is inclined by about 45° with respect to the stem 40 toward the first connection hole 12. The diameter of the second connection hole 22 is almost the same as that of the first connection hole 12. A flange pipe 27 is inserted into the second connection hole 22 and screwed or welded thereto. When the shoulder 31 of the ball 30 is accommodated in the groove 24 as described above, an O-ring packing 23 is inserted between the groove 24 of the body cap 20 and the shoulder 31 of the ball 30.

The packing, that is, the space filler 50 in the present preferred embodiment, is integrally formed into one piece, has an opening 52 in a portion at which the first connection hole 12 is formed, and is provided closely contacting both the outer surface of the ball 30 and the inner wall of the body 10 therebetween. That is, the space filler 50 is formed integrally, that is, as one piece, to cover the entire outer surface of the ball 30 except for the first connection hole 12 and is installed between the outer surface of the ball 30 and the inner wall of the body 10. A flange 51 is formed by bending a free end of the space filler 50 to closely fit between the body 10 and the body cap 20. Although the space filler 50 can be formed of a variety of materials, in the present preferred embodiment, it is formed of polytetrafluoroethylene (PTFE) exhibiting superior elasticity among synthetic material in a foil casting method.

In the meantime, the control lever 60 includes an extension rod 61 coupled to the stem 40 and a holder member 63 coupled to the extension rod 61 to be capable of sliding in a direction almost perpendicular to a direction of an axis of the extension rod 61. A through hole 61a is formed at an end portion of a free end of the extension rod 61 and the holder member 63 is inserted into the through hole 61a to be capable of sliding. A hook portion 65 is formed at an end portion of the holder member 63 so that, when the holder member 63 is moved with respect to the extension rod 61 in a lengthwise direction of the holder member 63, the holder member 63 is prevented from completely escaping therefrom. When the control lever 60 is rotated, a rotational force is delivered to the stem 40 and the ball 30 connected to the stem 40 is rotated in the cavity of the body 10. Here, if the holder member 63 bumps pipes disposed near around when a user holding the holder member 63 rotates the ball 30, the user may have the holder member 63 slide in the opposite direction through the through hole 61a and then hold the holder member 63 at the opposite side and rotate the ball 30.

The position indication portion 70 includes a rotation plate 71 where four position determination grooves 72 are formed by indenting a part of an edge portion to a predetermined depth toward the center of rotation and coupled to the stem 40 at the lower portion of the extending rod 61 to be rotated by being engaged with the rotation of the stem 40, an indication member 73 fixed to the body 10 to indicate a specific point of the upper portion of the rotation plate 71, and a sound generating member 75 coupled to the body 10 at the lower portion of the indication member 73, to be capable of elastically moving toward the center of the rotation plate 71, and contacting the edge portion of the rotation plate 71. The sound generating member 75 has a structure in which a striking ball 75c is installed in a cylindrical accommodating member 75b to be disposed in front of a spring 75a installed in the accommodating member 75b by being elastically compressed. The striking ball 75c contacts the edge portion of the rotation plate 71 by an elastic force of the spring 75a. When the rotation plate 71 being rotated in engagement with the rotation of the ball 30 is accommodated in the position determination groove 72, the striking ball 75c collides with the edge portion where the position determination groove 72 is formed, by the elastic force of the spring 75a, generating sound. Thus, a user hearing the sound can stop rotating the ball 30 by the control lever 60.

The locking member 80 is coupled to the body 10 to be capable of sliding up and down at a position rotated by about 90° from the body 10 to which the indication member 73 is coupled. Since the locking member 80 includes a protruding portion 81 at an upper end thereof, when the locking member 80 is pressed downward so that the protruding portion 81 is caught by the position determination groove 72 and maintained in the state, the ball cannot be rotated. Accordingly, even when a force is applied to the control lever 60, the ball 30 is prevented from rotating and maintained at the particular position.

Figure 5:
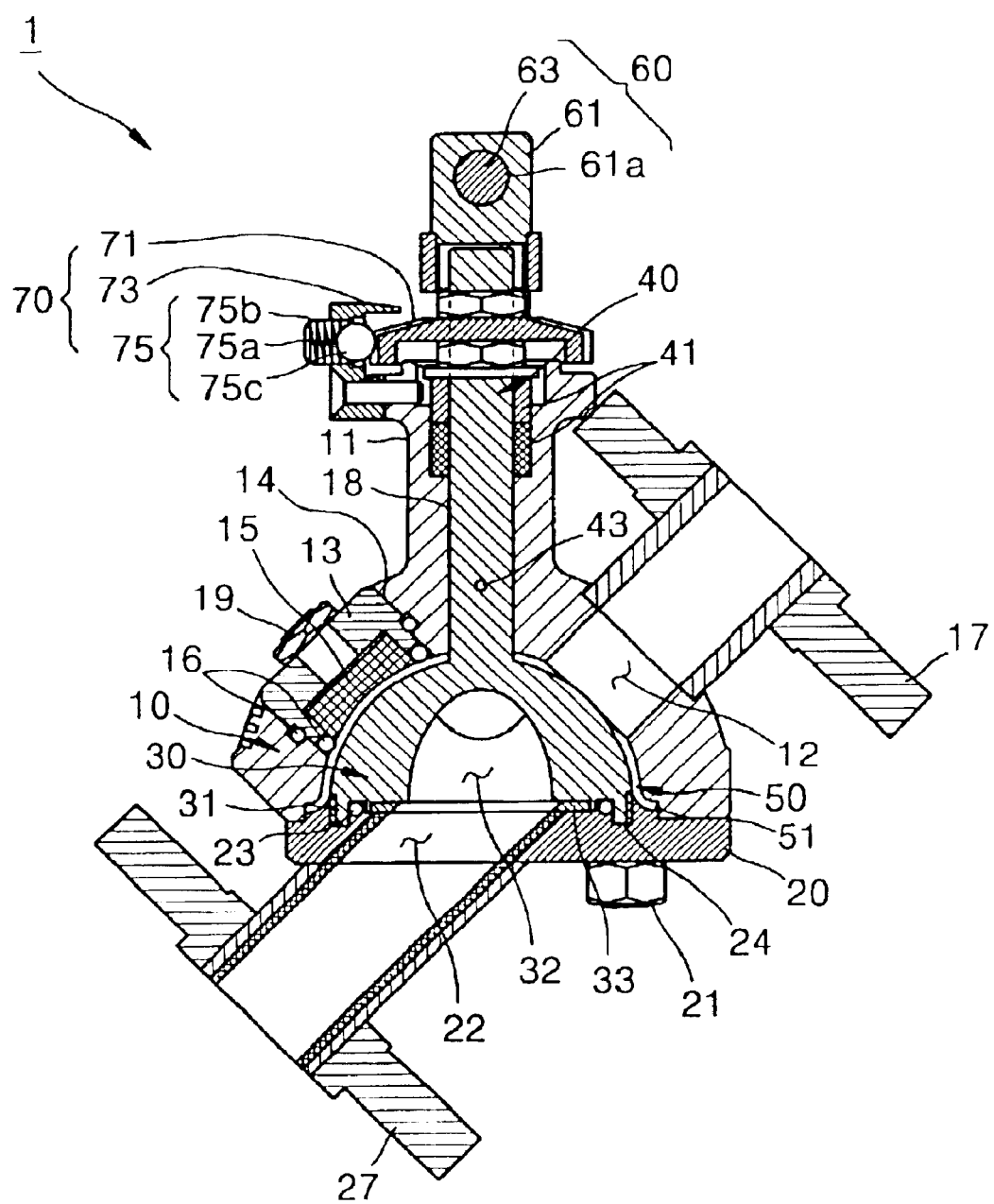
FIG. 5 is a sectional view illustrating a state of the ball of FIG. 4 being rotated by 90°.
Figure 6:
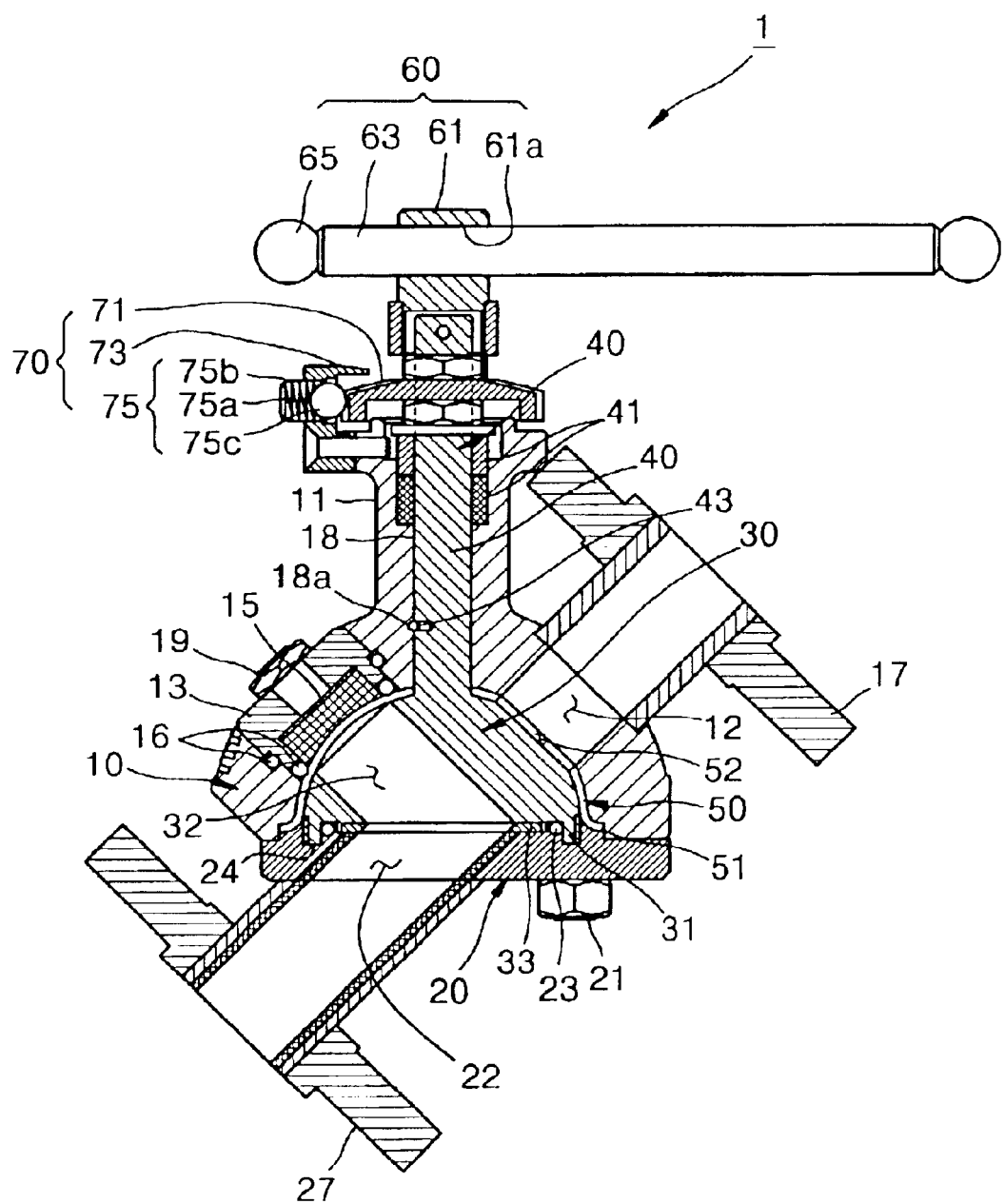
FIG. 6 is a sectional view illustrating a state of the ball of FIG. 4 being rotated by 180°.

According to the above structure, when the control lever 60 is rotated, the stem 40 connected to the control lever 60 and the ball 30 connected to the stem 40 is rotated so that the ball 30 opens or closes the first connection hole 12. FIG. 5 shows a state of the ball of FIG. 3 rotating by 90°. FIG. 6 shows a state of the ball rotating by 180°. As can be seen from these drawings, unlike the conventional half ball valve or ball valve, fluid is not confined in the passage 32 in the ball when the passage 32 is blocked. Meanwhile, when rotating the ball 30 with the control lever 60, a worker can recognize whether the ball 30 is at the open position or at the close position through the position indication portion 70. By hearing the sound generated whenever the sound generating member 75 is disposed at the position determination groove 72 of the rotation plate 71, the control lever 60 can be operated more conveniently.

Figure 7:
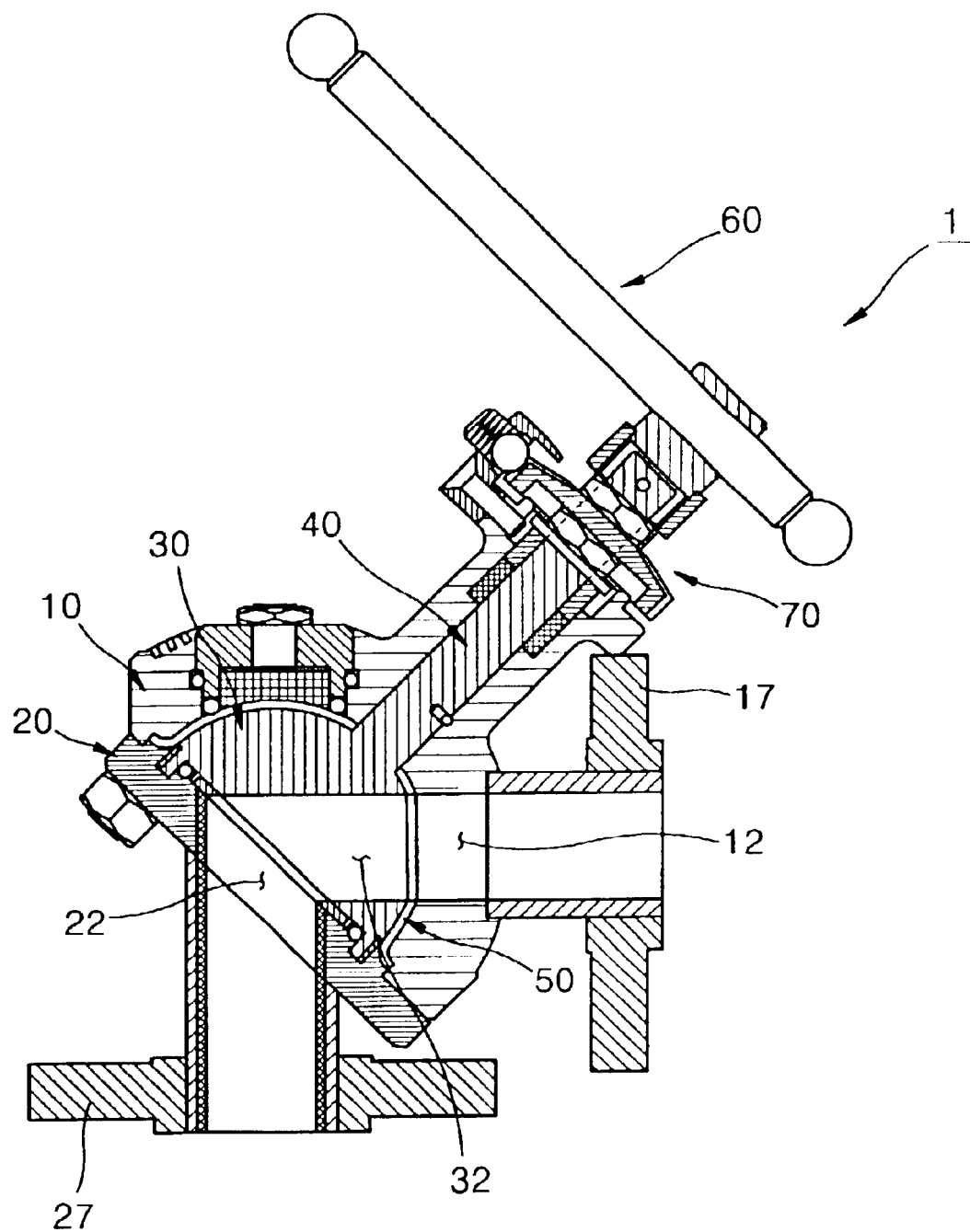
FIG. 7 is a sectional view of a half ball valve according to a second preferred embodiment of the present invention which is formed of an angle type.

FIG. 7 shows an angle type half ball valve according to a second preferred embodiment of the present invention. Referring to the drawing, it can be seen that the body cap 20 is rotated by 180° from the position described in the first preferred embodiment. The axis of the second connection hole 22 is arranged to be perpendicular to the axis of the first connection hole 12. A half ball valve 1 of a angle type is formed in the above method.

Figure 8:
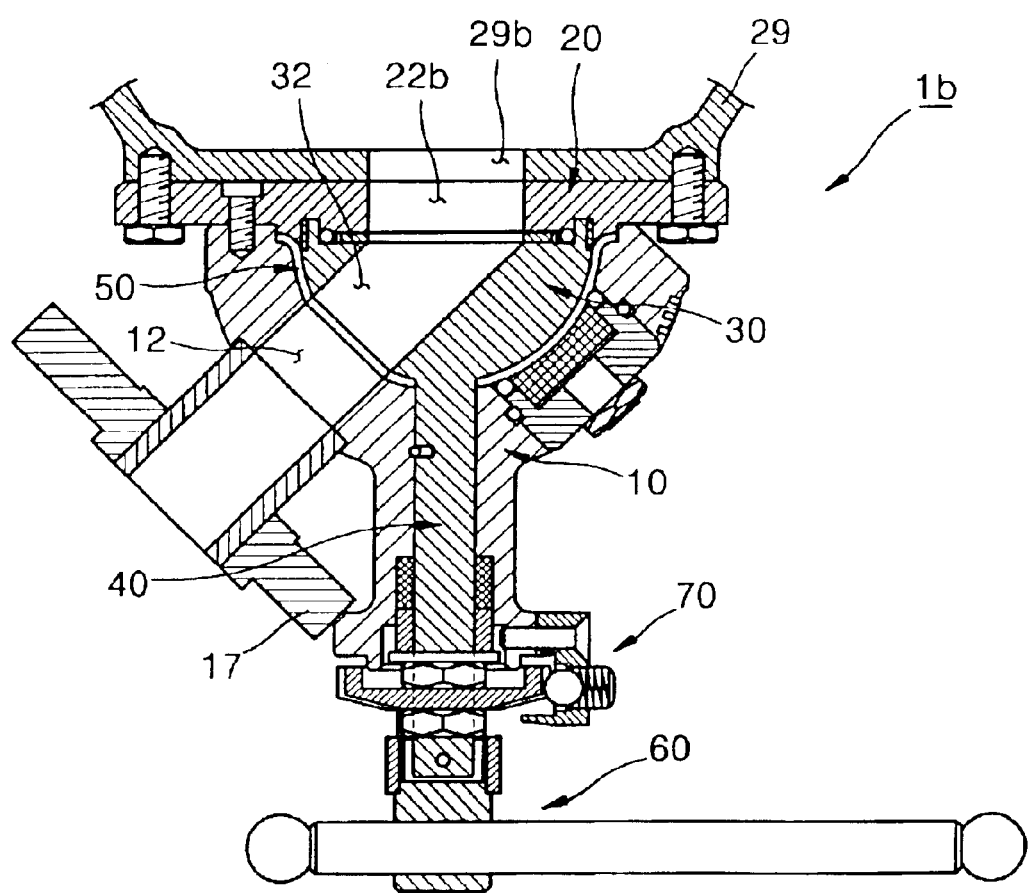
FIG. 8 is a sectional view of a half ball valve according to a third preferred embodiment of the present invention, which is formed as a valve for discharge at the bottom of a tank.

FIG. 8 shows a half ball valve according to a third preferred embodiment of the present invention which is formed as a valve for discharge at the bottom of a tank. The same reference numerals are used for the same elements shown in the first preferred embodiment while modified elements are indicated by adding 'b' after the reference numerals. Here, it can be seen that the second connection hole 22b of the body cap 20 is formed coaxially with the axis of the stem 40. The body cap 20 is screwed to the lower end surface of the cover of a tank 29 having a discharge hole 29b which is aligned with the second connection hole 22. A half ball valve 1b is used as a ball valve for discharge.

In the above-described preferred embodiments, only the passage 32 can be open or closed by the half ball valve. However, for example, in the drawings, another ball valve can be connected to the open portion in the body 10, that is, the third connection hole 14, to which the seal cover 13 is screwed. Accordingly, a multi-way ball valve or a multi-way distributor can be obtained.

Figure 9:
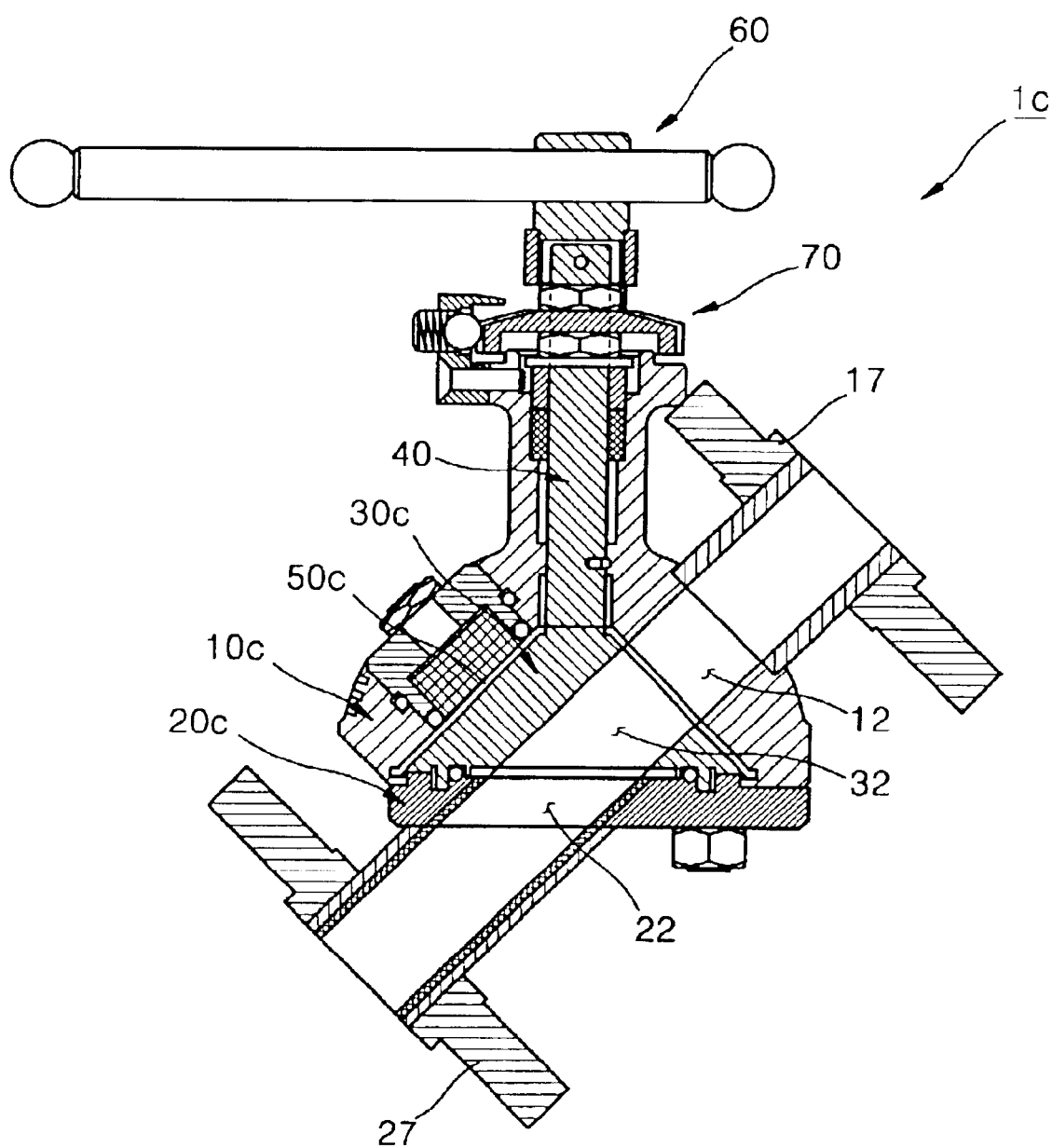
FIG. 9 is a sectional view of a half ball valve according to a fourth preferred embodiment of the present invention, which has a ball having a truncated cone shape.

FIG. 9 shows a half ball valve according to a fourth preferred embodiment of the present invention which has a ball having a truncated cone shape. Here, the same reference numerals are used for the same elements as those shown in the first preferred embodiment while modified elements are indicated by adding 'c' after the reference numerals. In the half ball valve 1c according to the present preferred embodiment, a truncated cone type ball 30c is accommodated in the cavity in a body 10c. Accordingly, some parts have different shapes from those shown in FIG. 1 to correspond to the truncated cone type ball 30c. Although not shown in the drawing, a cylindrical ball can be used instead of the truncated cone type ball 30c.

As described above, in the present invention, an integral packing having an opening in the portion of the first connection hole 12, that is, the space filler 50, is provided between the body 10 and the ball 30. The hemispherical ball 30 is accommodated in the cavity of the body 10 to be capable of rotating. The passage 32 of the ball 30 and the first connection hole 12 of the body 10 are inclined with respect to the stem 40, preferably, by 45°. The second connection hole 22 connected to the passage 32 of the ball 30 is formed in the body cap 20. Thus, when the passage 32 in the pipeline is blocked, fluid flowing through the pipeline is not confined in the passage 32 of the ball 30. Also, not only is dead space not formed at all but also a gap between the ball 30 and the body 10 can be completely sealed by the space filler 50 with no gap therebetween, so that the fluid flowing through the passage 32 is prevented from remaining in the gap and being deposited therein.

In the above-described preferred embodiments, the first connection hole 12 of the body 10 and the passage 32 of the ball 30 are described as being inclined by about 45° with respect to the axis of the stem 40 so as to connect the second connection hole 22 of the body cap 20 and the passage 32 of the ball 30. However, it is obvious that the first connection hole 12 of the body 10 and the passage 32 of the ball 30 are formed at an angle less than 90° with respect to the axis of the stem 40, preferably, 30° through 60°, so that the second connection hole 22 of the body cap 20 and the passage 32 of the ball 30 are connected. To form the first connection hole 12 of the body 10 and the passage 32 of the ball 30 at such an angle, the size and shape of the ball 30 can be slightly changed, if necessary, and it is required that interference with the stem 40 does not occur.

In the above-described preferred embodiments, the packing interposed between the outer surface of the ball 30 and the inner wall of the body 10 is the space filler 50. However, the packing can be attached to or coated on the outer surface of the ball 30 if the packing can meet the objective of the present invention to completely seal a gap between the ball 30 and the inner wall of the body 10. Of course, the packing can be attached to or coated on the inner wall of the body 10.

Although it is described in the above preferred embodiments that the third connection holes 14 are formed in the body 10, the third connection hole 14 may not be formed in the body 10.

Also, in the above-described preferred embodiments, the through hole 61a is formed in the extension rod 61 of the control lever 60 and the holder member 63 is installed at the through hole 61a to be capable of sliding therein. However, even when a lengthy slit is formed in the lengthwise direction of the holder member 63 and the extension rod 61 is installed to penetrate the slit, the holder member 63 can relatively move with respect to the extension rod 61.

As described above, according to the present invention, the size of the ball can be reduced and, when the passage in the pipeline is blocked, the fluid flowing in the pipeline is not confined in the passage of the ball. Also, not only is dead space not formed but also the gap between the ball and the body is completely sealed by the space filler, so that the fluid flowing through the pipeline is prevented from remaining in the gap and being deposited therein. Furthermore, the full bore concept can be realized in which no difference exists between the amount of the fluid that is coming in through the inlet and the amount of the fluid that is discharged through the outlet in the ball valve installed on the pipeline.

What is claimed is:

1. A half ball valve comprising:
    a body including cavity having an assembly opening, a stem opening formed at a side of the body opposite to the assembly opening to connect the cavity and the outside, and a first connection hole inclined with respect to an axis of the stem opening;
    a ball accommodated in the cavity of the body through the assembly opening to be capable of rotating to switch between an open position at which the first connection hole is open and a close position at which the first connection hole is blocked, and having a passage connected to the first connection hole at the open position and formed inclined to an axis of the stem opening;
    a stem connecting a control lever outside the body and the ball along the stem opening;
    a body cap having a second connection hole connected to the passage of the ball and coupled to the body to cover the cavity at the assembly opening side; and
    a packing interposed between an outer surface of the ball and an inner wall of the body.

2. The half ball valve as claimed in claim 1, wherein the outer surface of the ball and the inner wall of the body are formed to approximately corresponding to each other.

3. The half ball valve as claimed in claim 1, wherein the packing is integrally formed into one piece.

4. The half ball valve as claimed in claim 3, wherein the packing is a space filler having an opening in a position at which the first connection hole is formed and closely contacting both the outer surface of the ball and the inner wall of the body.

5. The half ball valve as claimed in claim 4, wherein the space filler is formed of polytetrafluoroethylene (PTFE).

6. The half ball valve as claimed in claim 4, wherein the space filler is formed in a foil casting method.

7. The half ball valve as claimed in claim 4, wherein the space filler has a flange bent outward to be fixedly inserted between the body and the body cap.

8. The half ball valve as claimed in any of claims 1 through 7, wherein the passage in the ball is inclined at an angle of between 30°-60° with respect to the stem.

9. The half ball valve as claimed in claim 1, wherein the first connection hole of the body and the second connection hole of the body cap are coaxially formed.

10. The half ball valve as claimed in claim 1, wherein the second connection hole of the body cap has a central axis having an angle of about 90° with respect to a central axis of the first connection hole.

11. The half ball valve as claimed in claim 1, wherein the second connection hole of the body cap is coaxially formed with the stem.

12. The half ball valve as claimed in claim 1, wherein the body further comprises a third connection hole formed at least one of positions spaced horizontally at angles of 90°, 180°, and 270° from the first connection hole around the center axis of the stem.

13. The half ball valve as claimed in claim 12, wherein the third connection hole is sealed by a seal cover accommodated in the third connection hole and further comprises a ring packing provided between the seal cover and the ball and having a diameter greater than that of the passage.

14. The half ball valve as claimed in claim 1, wherein the body has an outside contour of a hemispherical shape and comprises a sleeve where the stem opening of the body is formed.

15. The half ball valve as claimed in claim 1, wherein a circular groove is formed in the body cap and a circular shoulder accommodated in the groove of the body cap is provided at the end portion of the ball at the body cap side.

16. The half ball valve as claimed in claim 15, wherein an O-ring packing is inserted between the groove of the body cap and the shoulder of the ball.

17. The half ball valve as claimed in claim 1, wherein the control lever comprises an extension rod coupled to the stem; and
  a holder member coupled to the extension rod to be capable of sliding in a direction crosswise to a direction of the axis of the extension rod.

18. The half ball valve as claimed in claim 1, further comprising a position indication portion indicating the position of the ball with respect to the first connection hole.

19. The half ball valve as claimed in claim 18, wherein the position indication portion comprises:
  a rotation plate fixed to the stem and rotating by being engaged with the rotation of the stem and having a plurality of position determination grooves formed by indenting part of an edge portion to a predetermined depth toward the center of rotation;
  an indication member fixed to the body to indicate a specific point of an upper portion of the rotation plate; and
  a sound generating member coupled to the body to be capable of elastically moving toward the center of the rotation plate and elastically contacting the edge portion of the rotation plate and generating sound by colliding with the edge portion when being accommodated in the position determination groove.

20. The half ball valve as claimed in claim 19, further comprising a locking member coupled to the body at a side portion of the rotation plate to be capable of sliding between a locking position at which the locking member is locked in the position determination groove of the rotation plate and maintained in the position determination groove and a release position at which the locking member is released from the position determination groove.

* * * * *